United States Patent
Lin et al.

(10) Patent No.: US 12,279,346 B2
(45) Date of Patent: Apr. 15, 2025

(54) LIGHTING ADJUSTMENT SYSTEM AND METHOD

(71) Applicant: TSINGHUA UNIVERSITY, Beijing (CN)

(72) Inventors: Borong Lin, Beijing (CN); Qinyi Zhang, Beijing (CN); Yunyi Zeng, Beijing (CN); Juan Yu, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 70 days.

(21) Appl. No.: 18/015,674

(22) PCT Filed: Mar. 18, 2021

(86) PCT No.: PCT/CN2021/081506
§ 371 (c)(1),
(2) Date: Jan. 11, 2023

(87) PCT Pub. No.: WO2022/012071
PCT Pub. Date: Jan. 20, 2022

(65) Prior Publication Data
US 2024/0040680 A1 Feb. 1, 2024

(30) Foreign Application Priority Data
Jul. 13, 2020 (CN) .................. 202010667327.X

(51) Int. Cl.
*H05B 45/12* (2020.01)
*F21V 14/02* (2006.01)
(Continued)

(52) U.S. Cl.
CPC ............. *H05B 45/12* (2020.01); *F21V 14/02* (2013.01); *H05B 45/325* (2020.01); *H05B 47/17* (2020.01); *H05B 47/19* (2020.01); *F21Y 2115/10* (2016.08)

(58) Field of Classification Search
CPC ...... H05B 45/12; H05B 45/325; H05B 47/17; H05B 47/19; H05B 47/11; H05B 47/175–195; F21V 14/02; F21Y 2115/10
See application file for complete search history.

(56) References Cited

U.S. PATENT DOCUMENTS

| | | | |
|---|---|---|---|
| 2019/0268999 A1 | 8/2019 | Oobayashi et al. | |
| 2020/0267822 A1* | 8/2020 | Casey | H05B 47/11 |
| 2021/0029789 A1* | 1/2021 | Ganick | H05B 45/20 |

FOREIGN PATENT DOCUMENTS

| | | |
|---|---|---|
| CN | 102595711 A | 7/2012 |
| CN | 104812119 A | 7/2015 |

(Continued)

OTHER PUBLICATIONS

First office action issued Jan. 12, 2021 by CNIPA for Chinese Patent Application No. 202010667327.X filed Jul. 13, 2020.

*Primary Examiner* — Renan Luque
(74) *Attorney, Agent, or Firm* — Owen G. Behrens; Smith & Hopen, P.A.

(57) ABSTRACT

The present disclosure relates to the field of lighting adjustment technologies, and in particular to a lighting adjustment system and method. The system includes: a light sensor, a personnel controller, a central processing unit, and a lighting device, where the light sensor, the personnel controller, and the lighting device are all wirelessly connected to the central processing unit; the light sensor is arranged at a preset monitoring point, and configured to receive monitoring information at the monitoring point; the personnel controller is configured to obtain a lighting environment creation selection of control personnel; the central processing unit is configured to regulate beam angle, color temperature, and illuminance of the lighting device in real time based on the received monitoring information and the lighting environ- (Continued)

ment creation selection; and the lighting device is arranged at the monitoring point preset indoors.

17 Claims, 6 Drawing Sheets

(51) Int. Cl.
  *H05B 45/325* (2020.01)
  *H05B 47/17* (2020.01)
  *H05B 47/19* (2020.01)
  *F21Y 115/10* (2016.01)

(56) References Cited

FOREIGN PATENT DOCUMENTS

| | | |
|---|---|---|
| CN | 106402757 A | 2/2017 |
| CN | 110267416 A | 9/2019 |
| CN | 209964340 U | 1/2020 |
| CN | 111212496 A | 5/2020 |
| CN | 111629475 A | 9/2020 |

\* cited by examiner

- ⬤ Light sensor mounted at the height of human eyes (1.2 m from the ground)
- ■ Lighting device

LIGHTING ADJUSTMENT SYSTEM AND METHOD

CROSS REFERENCE TO RELATED APPLICATION(S)

This application claims priority to Chinese Patent Application No. CN202010667327.X, filed with the China National Intellectual Property Administration on Jul. 13, 2020, and entitled "LIGHTING ADJUSTMENT SYSTEM AND METHOD", which is incorporated herein by reference in its entirety.

TECHNICAL FIELD

The present disclosure relates to the field of lighting adjustment technologies, and in particular to a lighting adjustment system and method.

BACKGROUND

The lighting environment is an important part of an indoor environment. Indoor lighting is usually required to meet the actual personal needs to ensure visual comfort.

In recent years, it has been found through studies that in addition to visual effects, the lighting environment also has non-visual effects on the human body. Features such as illuminance, color temperature, and spectral characteristic of the light received by the human eye affect people's work efficiency, psychological state, and health state, which are non-visual effects. Affected by the regulation characteristics of the human body's own circadian rhythm, personal requirement for the lighting condition is also constantly changing throughout the day. However, long-term poor lighting exposure will lead to a decrease in people's work efficiency, and even impacts people's physical and mental health. Therefore, it is necessary to start with the change of illuminance and color temperature of light so as to create an indoor environment with healthy dynamic non-visual light.

In the existing related art, the lighting control system and method proposed based on the visual requirements do not take into consideration the non-visual effects of light exposure on human eyes of indoor personnel, and only illuminance and color temperature are adjusted. Thus, requirements of creating an indoor environment with healthy dynamic non-visual light cannot be met. Therefore, the lighting parameters adjusted through the existing lighting control technology are limited.

SUMMARY

In view of this, an objective of the present disclosure is to provide a lighting adjustment system and method, so as to resolve the problem that light parameters adjusted through the existing lighting control technology are limited.

To achieve the foregoing objective, the present disclosure provides a lighting adjustment system, including: a light sensor, a personnel controller, a central processing unit, and a lighting device, where
 the light sensor, the personnel controller, and the lighting device are all wirelessly connected to the central processing unit;
 the light sensor is arranged at a monitoring point preset indoors, and configured to receive monitoring information at the monitoring point and transmit the monitoring information to the central processing unit, where the monitoring information includes illuminance information and color temperature information;
 the personnel controller is configured to obtain a lighting environment creation selection of control personnel and transmit the lighting environment creation selection to the central processing unit;
 the central processing unit is configured to receive the monitoring information of the light sensor and the lighting environment creation selection of the personnel controller, and regulate beam angle, color temperature, and illuminance of the lighting device in real time based on the monitoring information and the lighting environment creation selection; and
 the lighting device is arranged at the monitoring point preset indoors and configured to perform lighting according to a regulatory instruction of the central processing unit.

Optionally, a mounting height of the light sensor is an eye height of personnel in a sitting state; and a monitoring probe of the light sensor is perpendicular to the ground, where the monitoring probe of the light sensor is configured to monitor a lighting condition of the lighting device in a perpendicular direction.

Optionally, the lighting device specifically includes a control module, a WiFi module, a light source module, and a driving module that are provided in a lamp tube, where
 the control module communicates with the central processing unit using the WiFi module;
 the light source module is mounted at a driving end of the driving module, and the control module is connected to both a control end of the light source module and a control end of the driving module;
 the light source module is configured to perform lighting; and
 the control module is configured to receive the regulatory instruction from the central processing unit, control, according to the regulatory instruction, the driving module to adjust a beam angle of the light source module, and adjust color temperature and illuminance of the light source module through a pulse width modulation dimming method.

Optionally, the driving module uses a mechanical push rod mechanism; and
 the mechanical push rod mechanism includes: a motor, an electric push rod, and a control device, where
 a driving end of the motor is connected to one end of the electric push rod; and the motor is configured to drive the electric push rod to move back and forth;
 the light source module is mounted at the other end of the electric push rod; and
 the control device is connected to both the control module and the motor; and the control device is configured to control, according to an instruction for the control module to adjust the beam angle, the motor to drive the electric push rod to move back and forth.

Optionally, the central processing unit specifically includes:
 a current moment obtaining module configured to obtain a current moment;
 a first determining module configured to determine whether the current moment is within a preset operation time period of the lighting device, to obtain a first determining result;
 a lighting state adjusting module configured to adjust, when the first determining result is no, a lighting state of the lighting device to an operation setting before turning off of the lighting device last time;

an information obtaining module configured to obtain, when the first determining result is yes, the beam angle of the lighting device and monitoring information acquired by the light sensor at the current moment;

a lighting parameter adjusting module configured to adjust a lighting parameter of the lighting device according to the beam angle and monitoring information, such that the lighting parameter meets a preset lighting parameter threshold condition corresponding to the preset operation time period, where the lighting parameter includes beam angle, color temperature, and illuminance.

Optionally, the lighting parameter adjusting module specifically includes:

a second determining unit configured to determine whether the beam angle is equal to a preset beam angle corresponding to the preset operation time period, to obtain a second determining result;

a beam angle adjusting unit configured to adjust, when the second determining result is no, the beam angle of the lighting device to the preset beam angle corresponding to the preset operation time period;

a third determining unit configured to determine, when the second determining result is yes, according to the monitoring information, whether the color temperature of the lighting device is in a preset color temperature threshold range corresponding to the preset operation time period, to obtain a third determining result;

a color temperature adjusting unit configured to adjust, when the third determining result is no, the color temperature of the lighting device using a pulse width modulation dimming method, such that the color temperature is in the preset color temperature threshold range;

a fourth determining unit configured to determine, when the third determining result is yes, according to the monitoring information, whether the illuminance of the lighting device is in a preset illuminance threshold range corresponding to the preset operation time period, to obtain a fourth determining result; and an illuminance adjusting unit configured to adjust, when the fourth determining result is no, the illuminance of the lighting device using the pulse width modulation dimming method, such that the illuminance is in the preset illuminance threshold range.

A lighting adjustment method is applied to the lighting adjustment system and includes:

obtaining a current moment;

determining whether the current moment is within a preset operation time period of a lighting device so as to obtain a first determining result;

when the first determining result is no, adjusting a lighting state of the lighting device to an operation setting before turning off of the lighting device last time;

when the first determining result is yes, obtaining beam angle of the lighting device and monitoring information acquired by a light sensor at the current moment; and adjusting a lighting parameter of the lighting device according to the beam angle and monitoring information, such that the lighting parameter meets a preset lighting parameter threshold condition corresponding to the preset operation time period, where the lighting parameter includes beam angle, color temperature, and illuminance.

Optionally, the adjusting a lighting parameter of the lighting device according to the beam angle and monitoring information, such that the lighting parameter meets a preset lighting parameter threshold condition corresponding to the preset operation time period specifically includes:

determining whether the beam angle is equal to a preset beam angle corresponding to the preset operation time period so as to obtain a second determining result;

when the second determining result is no, adjusting the beam angle of the lighting device to the preset beam angle corresponding to the preset operation time period;

when the second determining result is yes, determining, according to the monitoring information, whether the color temperature of the lighting device is in a preset color temperature threshold range corresponding to the preset operation time period so as to obtain a third determining result;

when the third determining result is no, adjusting the color temperature of the lighting device using a pulse width modulation dimming method, such that the color temperature is in the preset color temperature threshold range;

when the third determining result is yes, determining, according to the monitoring information, whether the illuminance of the lighting device is in a preset illuminance threshold range corresponding to the preset operation time period, so as to obtain a fourth determining result; and when the fourth determining result is no, adjusting the illuminance of the lighting device using the pulse width modulation dimming method, such that the illuminance is in the preset illuminance threshold range.

Optionally, the adjusting the color temperature of the lighting device using a pulse width modulation dimming method, such that the color temperature is in the preset color temperature threshold range specifically includes:

adjusting the color temperature of the lighting device using the pulse width modulation dimming method, and adjusting an adjustment value of the color temperature to $[\Delta T/50] \times 50K$, where $\Delta T$ represents a color temperature difference, and $\Delta T = T_{preset} - T_{actual}$; and $T_{preset}$ represents a preset color temperature value corresponding to the preset operation time period; $T_{actual}$ represents an actual color temperature value acquired by the light sensor; and K represents a unit of the color temperature;

determining whether the adjusted color temperature is in the preset color temperature threshold range so as to obtain a fifth determining result, where the preset color temperature threshold range is from a preset color temperature value $-100$ K to a preset color temperature value $+100$ K, and such range corresponds to the preset operation time period; and if the fifth determining result is no, returning to the "adjusting the color temperature of the lighting device using the pulse width modulation dimming method, and adjusting an adjustment value of the color temperature to $[\Delta T/50] \times 50K$."

Optionally, the adjusting the illuminance of the lighting device using the pulse width modulation dimming method, such that the illuminance is in the preset illuminance threshold range specifically includes:

adjusting the illuminance of the lighting device using the pulse width modulation dimming method, and adjusting an adjustment value of the illuminance to $[\Delta E/10] \times 10/E_{max}$, where $\Delta E$ represents an illuminance difference, and $\Delta E = E_{preset} - E_{actual}$; and $E_{preset}$ represents a preset illuminance value corresponding to the preset operation time period; $E_{actual}$ represents an actual illuminance value acquired by the light sensor; and Emax represents an illuminance value monitored by the light sensor under a maximum power of the lighting device and a natural light condition; and determining whether the adjusted illuminance is in the preset illuminance threshold range so as to obtain a sixth determining result, where the preset illuminance threshold range is from a preset illuminance value −20 lux to a preset illuminance value +20 lux, such range corresponds to the preset operation time period, and lux represents a unit of illuminance; and if the sixth determining result is no, returning to the "adjusting the illuminance of the lighting device using the pulse width modulation dimming method, and adjusting an adjustment value of the illuminance to [ΔE/10]×10/Emax."

According to the specific embodiments provided by the present disclosure, the present disclosure discloses the following technical effects:

The present disclosure provides a lighting adjustment system and method. The system includes: a light sensor, a personnel controller, a central processing unit, and a lighting device, where the light sensor, the personnel controller, and the lighting device are all wirelessly connected to the central processing unit; the light sensor is arranged at a monitoring point preset indoors, and configured to receive monitoring information at the monitoring point and transmit the monitoring information to the central processing unit, where the monitoring information includes illuminance information and color temperature information; the personnel controller is configured to obtain a lighting environment creation selection of control personnel and transmit the lighting environment creation selection to the central processing unit; the central processing unit is configured to receive the monitoring information of the light sensor and the lighting environment creation selection of the personnel controller, and regulate beam angle, color temperature, and illuminance of the lighting device in real time based on the monitoring information and the lighting environment creation selection; and the lighting device is arranged at the monitoring point preset indoors and configured to perform lighting according to a regulatory instruction of the central processing unit. The central processing unit in the lighting adjustment system regulates the beam angle, color temperature, and illuminance of the lighting device in real time based on the received monitoring information and the lighting environment creation selection, that is, automatically adjusts the lighting parameters of the lighting device. Therefore, the lighting parameters of the lighting device such as illuminance, color temperature, and beam angle being regulated and controlled dynamically helps to create an indoor environment with healthy non-visual light, and meets the needs of the human body for dynamic lighting, thereby improving the work efficiency of indoor personnel and their physiological and psychological states.

BRIEF DESCRIPTION OF THE DRAWINGS

To describe the embodiments of the present disclosure or the technical solutions in the related art more clearly, the accompanying drawings required in the embodiments are briefly introduced below. Obviously, the accompanying drawings described below are only some embodiments of the present disclosure. A person of ordinary skill in the art may further obtain other accompanying drawings based on these accompanying drawings without creative labor.

Numeral references: 1. light sensor; 2. personnel controller; 3. central processing unit; 4. lighting device; 5. control module; 6. WiFi module; 7. light source module; 8. driving module.

DETAILED DESCRIPTION OF THE EMBODIMENTS

The technical solutions of the embodiments of the present disclosure are clearly and completely described below with reference to the accompanying drawings. Apparently, the described embodiments are merely some rather than all of the embodiments of the present disclosure. All other embodiments obtained by those of ordinary skill in the art based on the embodiments of the present disclosure without creative efforts shall fall within the protection scope of the present disclosure.

An objective of the present disclosure is to provide a lighting adjustment system and method, so as to resolve the problem that light parameters adjusted through the existing lighting control technology are limited.

To make the above-mentioned objective, features, and advantages of the present disclosure clearer and more comprehensible, the present disclosure will be further described in detail below in conjunction with the accompanying drawings and specific embodiments.

Figure 1:
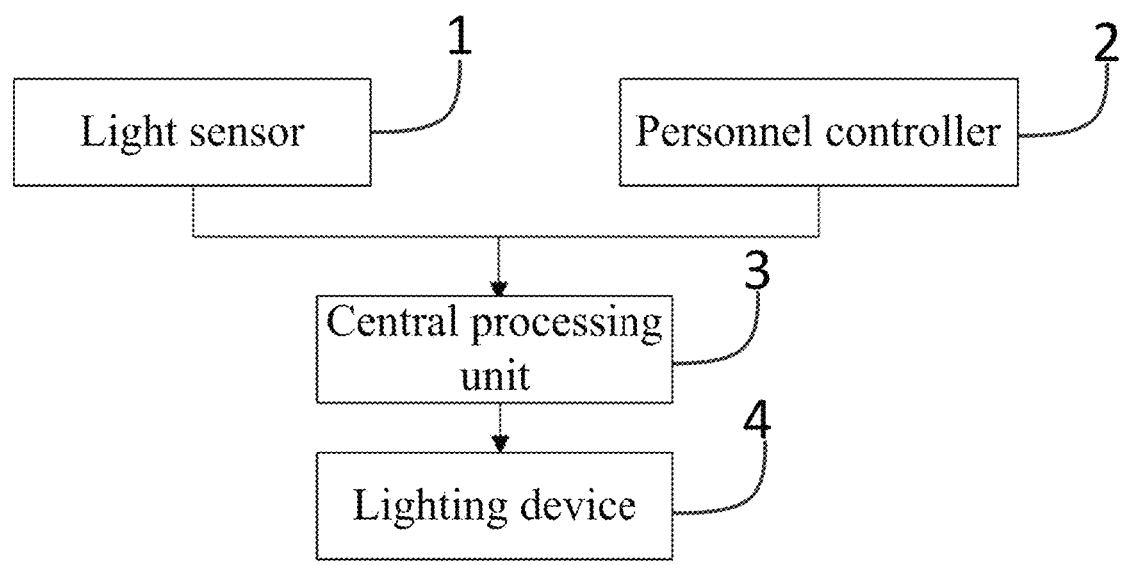
FIG. 1 is a structural diagram of a lighting adjustment system according to an embodiment of the present disclosure.

This embodiment provides a lighting adjustment system. FIG. 1 is a structural diagram of a lighting adjustment system according to an embodiment of the present disclosure. Referring to FIG. 1, the lighting adjustment system includes: a light sensor 1, a personnel controller 2, a central processing unit 3, and a lighting device 4.

The light sensor 1, the personnel controller 2, and the lighting device 4 are all wirelessly connected to the central processing unit 3. The light sensor 1, personnel controller 2, and lighting device 4 are each provided with a WiFi module. The light sensor 1, personnel controller 2, and lighting device 4 communicate with the central processing unit 3 using the WiFi modules.

The light sensor 1 and the lighting device 4 may be provided in plurality. The light sensor 1 and the lighting device 4 are all wirelessly connected to the central processing unit 3.

The light sensor 1 is arranged at a monitoring point preset indoors, and configured to receive monitoring information at the monitoring point and transmit the monitoring information to the central processing unit, where the monitoring information includes illuminance information and color temperature information.

A mounting height of the light sensor 1 is an eye height of personnel in a sitting state; and a monitoring probe of the light sensor 1 is perpendicular to the ground, where the monitoring probe of the light sensor 1 is configured to monitor a lighting condition of the lighting device in a perpendicular direction. In practical application, the light sensor is mounted on the facade of the personnel's work compartment, wall, or the like, and the mounting height of the light sensor is the height of the human eye of personnel in a sitting state (1.2 m from the ground). A monitoring probe of the light sensor is perpendicular to the ground and configured to monitor a lighting condition in a perpendicular direction.

The personnel controller 2 is configured to obtain a lighting environment creation selection of control personnel and transmit the lighting environment creation selection to the central processing unit. The lighting environment creation selection includes: a preset lighting parameter threshold condition corresponding to a preset operation time period of the lighting device, and an adjustment result of the lighting parameter of the lighting device by control personnel. The preset lighting parameter threshold condition corresponding to the preset operation time period of this embodiment include three modes: a wake-up mode, an alert mode, and a soothing mode, where the preset lighting parameter thresholds corresponding to the three modes are shown in Table 1.

TABLE 1

Preset lighting parameter thresholds corresponding to three modes

|  | Wake-up mode | Alert mode | Soothing mode |
| --- | --- | --- | --- |
| Time | 8:00-12:00 | 12:00-17:00 | 17:00-19:00 |
| Color temperature | 5000 Kelvin (K) | 3500 K | 3000 K |
| illuminance | 250 Lux (1x) | 270 lx | 1901 x |

The central processing unit 3 is configured to receive the monitoring information of the light sensor and the lighting environment creation selection of the personnel controller, and regulate beam angle, color temperature, and illuminance of the lighting device in real time based on the monitoring information and the lighting environment creation selection. Specifically, the central processing unit is configured to regulate the beam angle, color temperature, and illuminance of the lighting device in real time based on the monitoring information and the preset lighting parameter threshold condition corresponding to the preset operation time period in the lighting environment creation selection; or regulate the beam angle, color temperature, illuminance, and spectral characteristics of the lighting device based on, in the lighting environment creation selection, the adjusting result of the lighting parameter of the lighting device by control personnel.

The lighting device 4 is arranged at the monitoring point preset indoors and configured to perform lighting according to a regulatory instruction of the central processing unit.

The lighting device 4 specifically includes a control module, a WiFi module, a light source module, and a driving module that are provided in a lamp tube.

The control module communicates with the central processing unit using the WiFi module.

The light source module is mounted at a driving end of the driving module, and the control module is connected to both a control end of the light source module and a control end of the driving module.

The light source module is configured to perform lighting. The light source module uses multi-channel LED lamp beads as the light source.

The control module is configured to receive the regulatory instruction from the central processing unit, control, according to the regulatory instruction, the driving module to adjust a beam angle of the light source module, and adjust the color temperature, illuminance, and spectral characteristics of the light source module through a pulse width modulation dimming method. The control module adjusts the duty cycle of each color channel of the light source through the pulse width modulation (PWM) dimming method, so as to perform stepless adjustment on color temperature within the range of 2500 K-6500 K, and stepless adjustment on illuminance within the range of 0-100%.

The driving module uses a mechanical push rod mechanism. The mechanical push rod mechanism implements the stepless adjustment on the beam angle by adjusting the height of the light source module in the lamp tube.

The mechanical push rod mechanism includes: a motor, an electric push rod, and a control device.

A driving end of the motor is connected to one end of the electric push rod; and the motor is configured to drive the electric push rod to move back and forth.

The light source module is mounted at the other end of the electric push rod.

The control device is connected to both the control module and the motor; and the control device is configured to control, according to an instruction for the control module to adjust the beam angle, the motor to drive the electric push rod to move back and forth.

The central processing unit specifically includes:
a current moment obtaining module configured to obtain a current moment;
a first determining module configured to determine whether the current moment is within a preset operation time period of the lighting device, to obtain a first determining result;
a lighting state adjusting module configured to adjust, when the first determining result is no, a lighting state of the lighting device to an operation setting before turning off of the lighting device last time;
an information obtaining module configured to obtain, when the first determining result is yes, the beam angle of the lighting device and monitoring information acquired by the light sensor at the current moment; and
a lighting parameter adjusting module configured to adjust a lighting parameter of the lighting device according to the beam angle and monitoring information, such that the lighting parameter meets a preset lighting parameter threshold condition corresponding to the preset operation time period, where the lighting parameter includes beam angle, color temperature, and illuminance.

The lighting parameter adjusting module specifically includes:
a second determining unit configured to determine whether the beam angle is equal to a preset beam angle corresponding to the preset operation time period, to obtain a second determining result;

a beam angle adjusting unit configured to adjust, when the second determining result is no, the beam angle of the lighting device to the preset beam angle corresponding to the preset operation time period;

a third determining unit configured to determine, when the second determining result is yes, according to the monitoring information, whether the color temperature of the lighting device is in a preset color temperature threshold range corresponding to the preset operation time period, to obtain a third determining result; and a color temperature adjusting unit configured to adjust, when the third determining result is no, the color temperature of the lighting device using a pulse width modulation dimming method, such that the color temperature is in the preset color temperature threshold range.

The color temperature adjusting unit specifically includes:

a color temperature adjusting sub-unit configured to adjust the color temperature using the pulse width modulation dimming method, and adjust an adjustment value of the color temperature to $[\Delta T/50] \times 50K$, where $\Delta T$ represents a color temperature difference, and $\Delta T = T_{preset} - T_{actual}$; and $T_{preset}$ represents a preset color temperature value corresponding to the preset operation time period; $T_{actual}$ represents an actual color temperature value acquired by the light sensor; and K represents a unit of the color temperature;

a fifth determining sub-unit configured to determine whether the adjusted color temperature is in the preset color temperature threshold range so as to obtain a fifth determining result, where the preset color temperature threshold range is from a preset color temperature value $-100$ K to a preset color temperature value $+100$ K, and such range corresponds to the preset operation time period, where it is determined whether the adjusted color temperature is in the preset color temperature threshold range, that is, it is determined whether the adjusted color temperature is greater than the preset color temperature value $-100$ K corresponding to the preset operation time period and smaller than the preset color temperature value $+100$ K;

a color temperature adjusting return sub-unit configured to execute the color temperature adjusting sub-unit when the fifth determining result is no;

a fourth determining unit configured to determine, when the third determining result is yes, according to the monitoring information, whether the illuminance of the lighting device is in a preset illuminance threshold range corresponding to the preset operation time period, to obtain a fourth determining result; and an illuminance adjusting unit configured to adjust, when the fourth determining result is no, the illuminance of the lighting device using the pulse width modulation dimming method, such that the illuminance is in the preset illuminance threshold range.

The illuminance adjusting unit specifically includes:

an illuminance adjusting sub-unit configured to adjust the illuminance of the lighting device using the pulse width modulation dimming method, and adjust an adjustment value of the illuminance to $[\Delta E/10] \times 10/E_{max}$, where $\Delta E$ represents an illuminance difference, and $\Delta E = E_{preset} - E_{actual}$; and $E_{preset}$ represents a preset illuminance value corresponding to the preset operation time period; $E_{actual}$ represents an actual illuminance value acquired by the light sensor; and Emax represents an illuminance value monitored by the light sensor under a maximum power of the lighting device and a natural light condition;

a sixth determining sub-unit configured to determine whether the adjusted illuminance is in the preset illuminance threshold range so as to obtain a sixth determining result, where the preset illuminance threshold range is from a preset illuminance value $-20$ lux to a preset illuminance value $+20$ lux, such range corresponds to the preset operation time period, and lux represents a unit of illuminance, where it is determined whether the adjusted illuminance is in the preset illuminance threshold range, that is, it is determined whether the adjusted illuminance is greater than the preset illuminance value $-20$ lux corresponding to the preset operation time period and smaller than the preset illuminance value $+20$ lux; and an illuminance adjusting return sub-unit configured to execute the illuminance adjusting sub-unit when the sixth determining result is no.

The central processing unit further includes:

a seventh determining module configured to obtain a seventh determining result about whether color temperature is adjusted;

a color-temperature spectral-characteristic adjusting module configured to obtain a color temperature adjusting result when the seventh result is yes, and adjust the color temperature and spectral characteristic according to a color temperature adjusting result;

a spectral characteristic adjusting module configured to obtain a spectral characteristic adjusting result when the seventh determining result is no, determine the duty cycle of each color channel of the light source of the lighting device according to the spectral characteristic adjusting result, and regulate the spectral characteristic, where the spectral characteristic adjustment result is the composition ratio of each color channel of the light source;

a beam angle adjusting module configured to obtain a beam angle adjusting result and adjust the beam angle according to the beam angle adjusting result;

an illuminance adjusting module configured to obtain an illuminance adjusting result and adjust the illuminance according to the illuminance adjusting result;

an eighth determining module configured to obtain an eighth determining result about whether the preset lighting parameter threshold is adjusted;

a monitoring information obtaining module configured to obtain the monitoring information of the light sensor when the eighth determining result is yes;

an adjusted preset lighting parameter threshold obtaining module configured to obtain a to-be-adjusted application time period and an adjusted preset lighting parameter threshold corresponding to the to-be-adjusted application time period; and a preset lighting parameter threshold adjusting module configured to adjust, according to an adjusted preset lighting parameter threshold, the preset lighting parameter threshold corresponding to the to-be-adjusted application time period.

Figure 2:
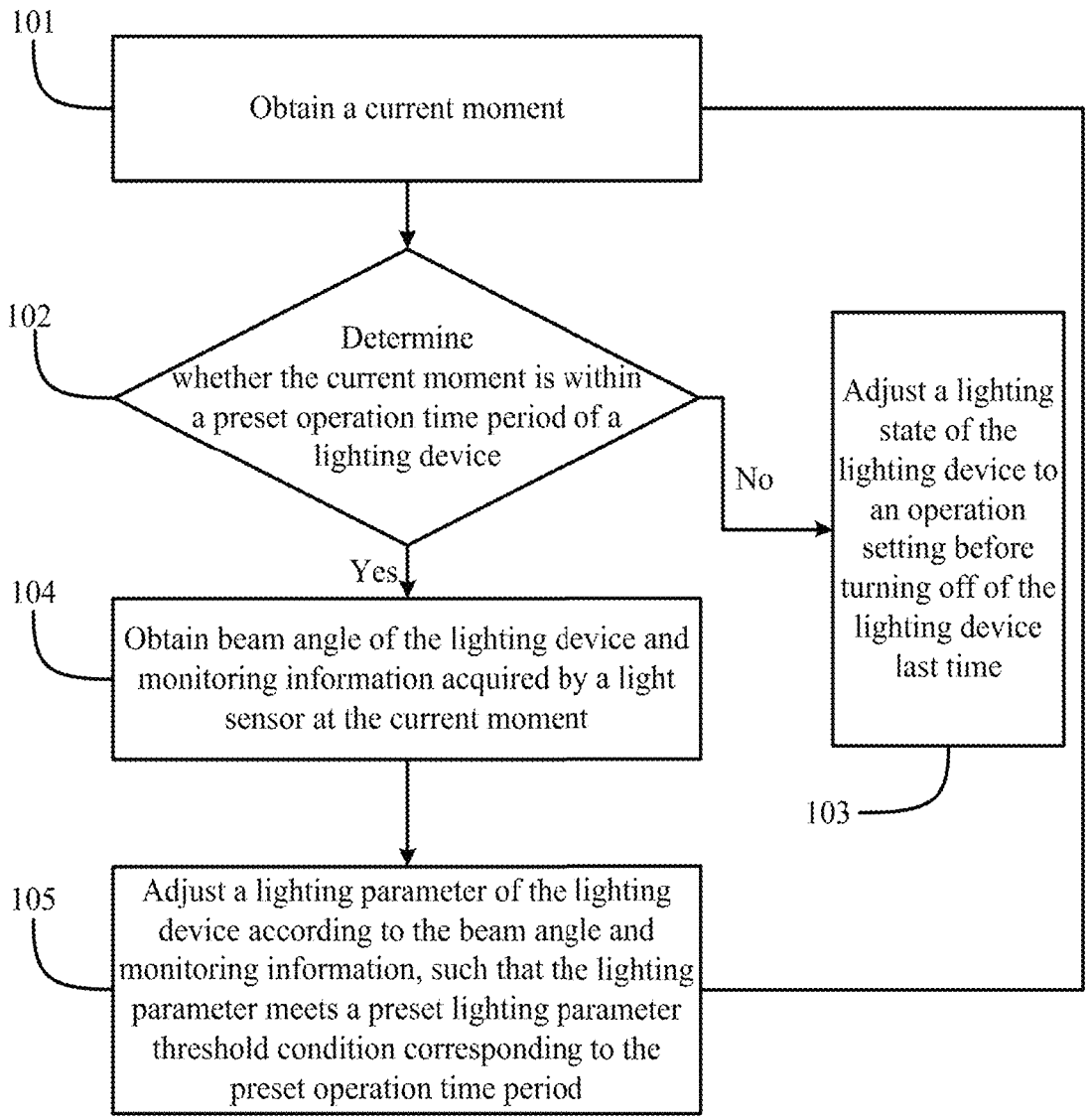
FIG. 2 is a flowchart of a lighting adjustment method according to an embodiment of the present disclosure.

This embodiment further provides a lighting adjustment method applied to the lighting adjustment system. FIG. 2 is a flowchart of a lighting adjustment method according to an embodiment of the present disclosure. Referring to FIG. 2, the lighting adjustment method includes the following steps:

Step 101: Obtain a current moment.

Step 102: Determine whether the current moment is within a preset operation time period of a lighting device so as to obtain a first determining result. The preset lighting parameter threshold condition corresponding to the preset operation time period of this embodiment include three modes: a wake-up mode, an alert mode, and a soothing mode, where the preset lighting parameter thresholds corresponding to the three modes are shown in Table 1.

TABLE 1

Preset lighting parameter thresholds corresponding to three modes

|  | Wake-up mode | Alert mode | Soothing mode |
|---|---|---|---|
| Time | 8:00-12:00 | 12:00-17:00 | 17:00-19:00 |
| Color temperature | 5000 K | 3500 K | 3000 K |
| illuminance | 250 lx | 270 lx | 190 lx |

Step 103: When the first determining result is no, adjust a lighting state of the lighting device to an operation setting before turning off of the lighting device last time.

Step 104: When the first determining result is yes, obtain beam angle of the lighting device and monitoring information acquired by a light sensor at the current moment.

Step 105: Adjust a lighting parameter of the lighting device according to the beam angle and monitoring information, such that the lighting parameter meets a preset lighting parameter threshold condition corresponding to the preset operation time period, where the lighting parameter includes beam angle, color temperature, and illuminance.

Step 105 specifically includes:

determining whether the beam angle is equal to a preset beam angle corresponding to the preset operation time period so as to obtain a second determining result;

when the second determining result is no, adjusting the beam angle of the lighting device to the preset beam angle corresponding to the preset operation time period;

when the second determining result is yes, determining, according to the monitoring information, whether the color temperature of the lighting device is in a preset color temperature threshold range corresponding to the preset operation time period so as to obtain a third determining result; and when the third determining result is no, adjusting the color temperature of the lighting device using a pulse width modulation dimming method, such that the color temperature is in the preset color temperature threshold range; The adjusting the color temperature of the lighting device using a pulse width modulation dimming method, such that the color temperature is in the preset color temperature threshold range specifically includes:

adjusting the color temperature of the lighting device using the pulse width modulation dimming method, and adjusting an adjustment value of the color temperature to [$\Delta T/50$]×50K, where $\Delta T$ represents a color temperature difference, and $\Delta T = T_{preset} - T_{actual}$; and $T_{preset}$ represents a preset color temperature value corresponding to the preset operation time period; $T_{actual}$ represents an actual color temperature value acquired by the light sensor; and K represents a unit Kelvin of the color temperature;

determining whether the adjusted color temperature is in the preset color temperature threshold range so as to obtain a fifth determining result, where the preset color temperature threshold range is from a preset color temperature value −100 K to a preset color temperature value +100 K, and such range corresponds to the preset operation time period, where it is determined whether the adjusted color temperature is in the preset color temperature threshold range, that is, it is determined whether the adjusted color temperature is greater than the preset color temperature value −100 K corresponding to the preset operation time period and smaller than the preset color temperature value +100 K;

if the fifth determining result is no, returning to the "adjusting the color temperature of the lighting device using the pulse width modulation dimming method, and adjusting an adjustment value of the color temperature to [$\Delta T/50$]×50K";

when the third determining result is yes, determining, according to the monitoring information, whether the illuminance of the lighting device is in a preset illuminance threshold range corresponding to the preset operation time period, so as to obtain a fourth determining result; and when the fourth determining result is no, adjusting the illuminance of the lighting device using the pulse width modulation dimming method, such that the illuminance is in the preset illuminance threshold range. The adjusting the color temperature of the lighting device using a pulse width modulation dimming method, such that the color temperature is in the preset color temperature threshold range specifically includes:

adjusting the illuminance of the lighting device using the pulse width modulation dimming method, and adjusting an adjustment value of the illuminance to [$\Delta E/10$]×10/Emax, where $\Delta E$ represents an illuminance difference, and $\Delta E = E_{preset} - E_{actual}$; and $E_{preset}$ represents a preset illuminance value corresponding to the preset operation time period; $E_{actual}$ represents an actual illuminance value acquired by the light sensor; and Emax represents an illuminance value monitored by the light sensor under a maximum power of the lighting device and a natural light condition;

determining whether the adjusted illuminance is in the preset illuminance threshold range so as to obtain a sixth determining result, where the preset illuminance threshold range is from a preset illuminance value −20 lux to a preset illuminance value +20 lux, such range corresponds to the preset operation time period, and lux represents a unit of illuminance, where it is determined whether the adjusted illuminance is in the preset illuminance threshold range, that is, it is determined whether the adjusted illuminance is greater than the preset illuminance value −20 lux corresponding to the preset operation time period and smaller than the preset illuminance value +20 lux; and if the sixth determining result is no, returning to the "adjusting the illuminance of the lighting device using the pulse width modulation dimming method, and adjusting an adjustment value of the illuminance to [$\Delta E/10$]×10/Emax."

The lighting adjustment method further includes:

obtaining, using a personnel controller, a seventh determining result about whether color temperature is adjusted;

obtaining a color temperature adjusting result using the personnel controller when the seventh result is yes, and adjusting the color temperature and spectral characteristic according to a color temperature adjusting result;

obtaining a spectral characteristic adjusting result using the personnel controller when the seventh determining result is no, determining the duty cycle of each color channel of the light source of the lighting device according to the spectral characteristic adjusting result, and regulating the spectral characteristic, where the spectral characteristic adjustment result is the composition ratio of each color channel of the light source;

obtaining a beam angle adjusting result using the personnel controller and adjusting the beam angle according to the beam angle adjusting result;

obtaining an illuminance adjusting result using the personnel controller and adjusting the illuminance according to the illuminance adjusting result;

obtaining, using the personnel controller, an eighth determining result about whether the preset lighting parameter threshold is adjusted;

obtaining the monitoring information of the light sensor when the eighth determining result is yes;

obtaining a to-be-adjusted application time period using the personnel controller and an adjusted preset lighting parameter threshold corresponding to the to-be-adjusted application time period; and adjusting, according to adjusted preset lighting parameter threshold, the preset lighting parameter threshold corresponding to the to-be-adjusted application time period.

This embodiment further provides a multi-parameter intelligent dynamic lighting adjustment system for optimizing the non-visual lighting environment of indoor offices. The multi-parameter intelligent dynamic lighting adjustment system is formed by a light sensor, a personnel controller, a central processing unit, and a lighting device.

Figure 3:
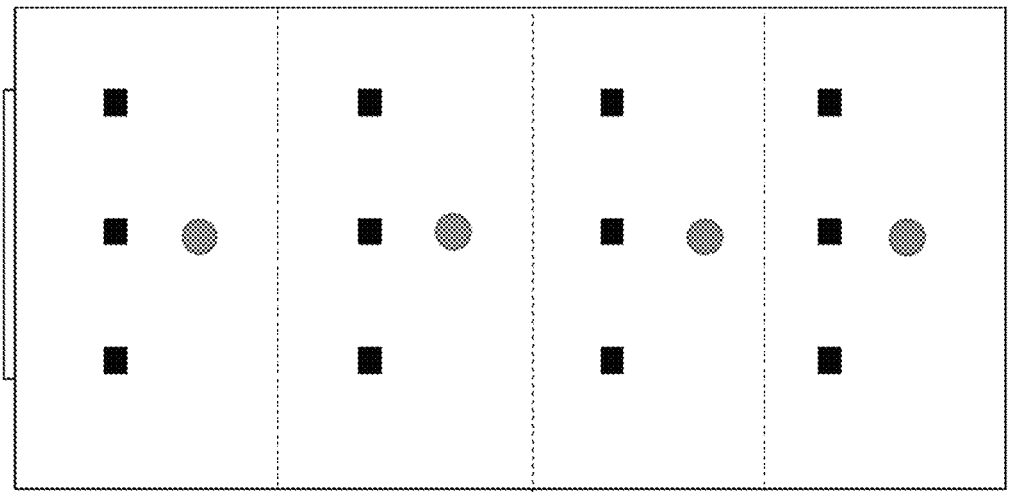
FIG. 3 is a schematic arrangement diagram of a light sensor in a large office space according to an embodiment of the present disclosure.

For a large office space, due to differences in natural lighting at different depths, according to the difference in indoor depth, the indoor space is divided into multiple lighting control regions, and a light sensor for monitoring illuminance and color temperature is set in each lighting control region. FIG. 3 is a schematic arrangement diagram of a light sensor in a large office space according to an embodiment of the present disclosure. The light sensors distributed in various regions of the room receive the illuminance and color temperature information at the indoor measurement points and transmit them to the central processing unit. After receiving the monitoring information of the indoor lighting environment from the light sensor, based on the subjective selection of the control personnel in the personnel controller on the creation of the lighting environment, the central processing unit regulates the operation of the indoor lighting device by region. Communication between the light sensor, human controller, central processing unit, and lighting device is transmitted through WiFi modules.

The light sensor is mounted on the facade of the personnel's work compartment, wall, or the like, and the mounting height of the light sensor is the height of the human eye of personnel in a sitting state (1.2 m from the ground). A monitoring probe of the light sensor is perpendicular to the ground and configured to monitor a lighting condition in a perpendicular direction.

Figure 4:
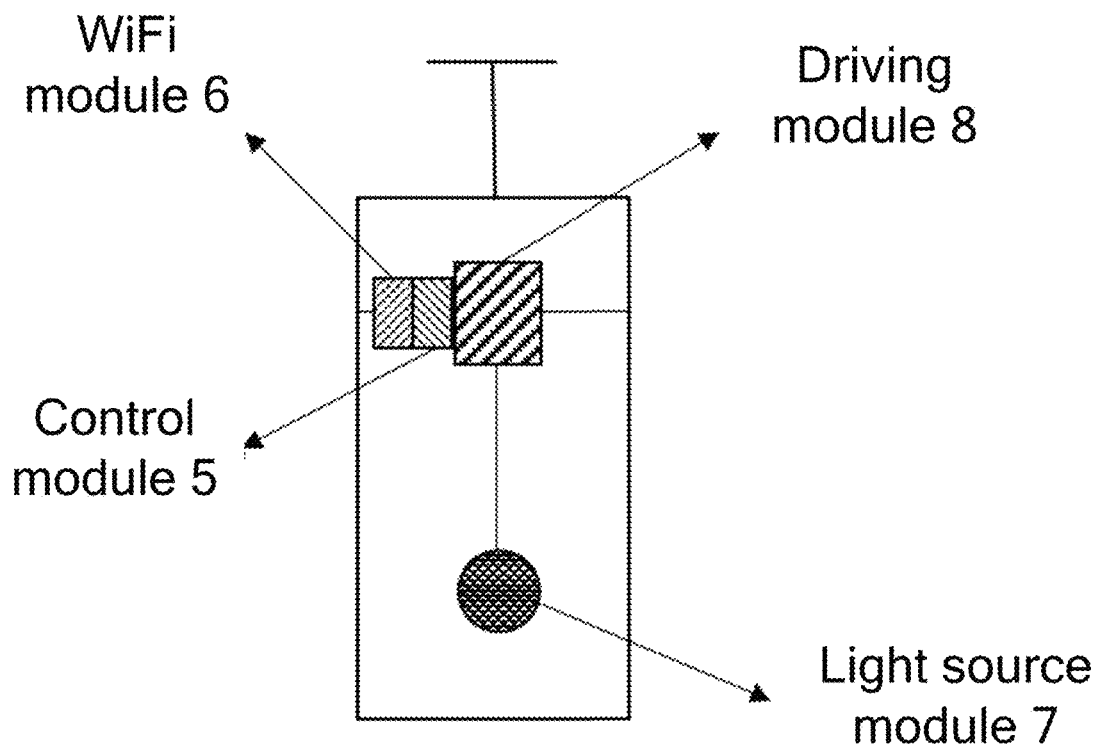
FIG. 4 is a structural diagram of a lighting device according to an embodiment of the present disclosure.

A WiFi module 6, a control module 5, a driving module 8, and a light source module 7 are arranged inside the lighting device, as shown in FIG. 4. Multi-channel LED lamp beads are used as the light sources for the light source module, and the control module adjusts the duty cycle of each color channel of the light source through the PWM dimming method, so as to perform stepless adjustment on color temperature within the range of 2500 K-6500 K, and stepless adjustment on illuminance within the range of 0-100%. The driving module inside the lighting device is provided with a mechanical push rod mechanism, so as to adjust the height of the light source module in the lamp tube through the mechanical push rod mechanism, and implement the stepless adjustment on the beam angle.

The control module 5 communicates with the central processing unit through the WiFi module 6, and the control module 5 is connected to both the control end of the light source module 7 and the end of the driving module 8. The control module controls the mixing ratio of each color channel of the light source according to the relationship between the duty ratio and the luminous flux. The PWM dimming method can be used not only to adjust the color temperature but also to adjust the illuminance. The basic principle of the PWM dimming method is to switch the LED driver repeatedly. When the switching frequency is higher than 100 Hz, the human eye cannot see the LED off but only the brightness determined by the duty cycle. The smaller the duty cycle, the longer the average off time of the switch. Therefore, when the average current becomes small, the human eyes observe that the LED becomes darker. Therefore, the control module only needs to provide digital pulses with different widths and narrownesses to adjust the average current of the circuit of the light source module, thereby adjusting the illuminance. The color temperature is adjusted by the composition ratio of each light source.

Figure 5:
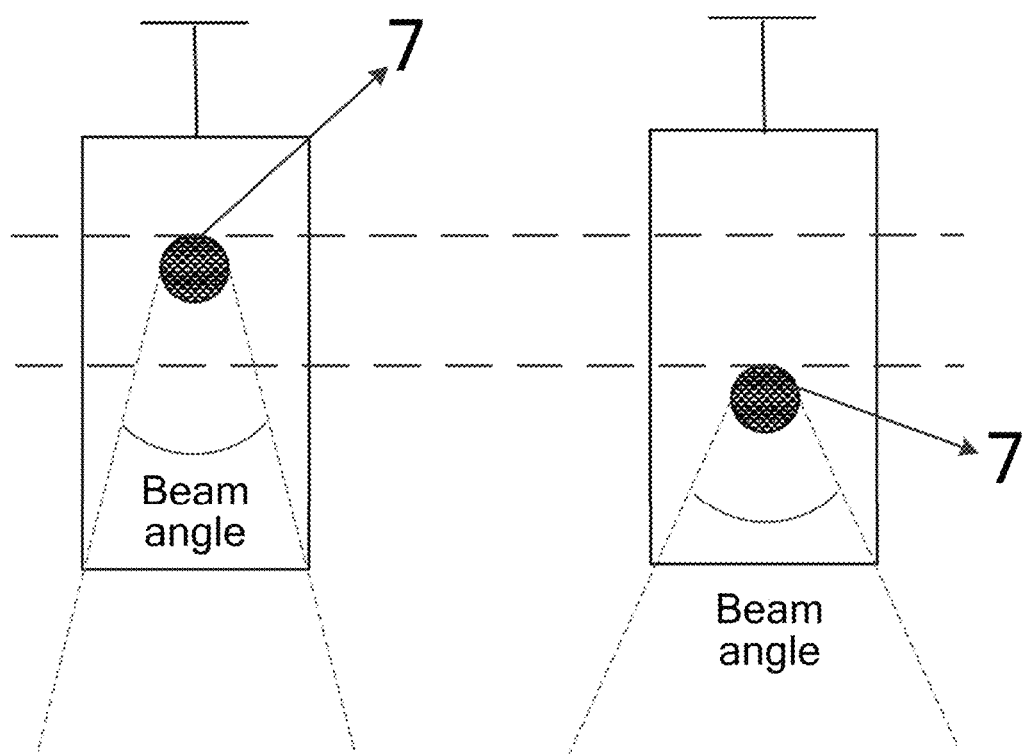
FIG. 5 is a schematic relationship diagram between a position of a light source module and a beam angle according to an embodiment of the present disclosure.

The mechanical push rod mechanism is a linear actuator mainly composed of a motor, an electric push rod, and a control device, converting the rotary motion of the motor into the linear motion of the electric push rod, which can make the electric push rod reciprocate within a range of travel. In actual use, the light source module is placed at a tail end of the electric push rod, and the reciprocating motion of the electric push rod in the perpendicular direction is the change of the height of the light source module in the lamp tube. FIG. 5 is a schematic relationship diagram between a position of a light source module and a beam angle according to an embodiment of the present disclosure. Referring to FIG. 5, a larger height of the light source module in the lamp tube indicates a smaller beam angle.

The multi-parameter intelligent dynamic lighting adjustment system operates in two operating modes: an automatic control mode and a manual adjustment mode. In the automatic control mode, the multi-parameter intelligent dynamic lighting adjustment system automatically adjusts lighting parameters according to the actual monitoring of the light conditions in the perpendicular direction at the height of the human eye in each region by the light sensor. The adjusted beam angle, color temperature, and illuminance of the lighting device meet preset lighting parameter threshold conditions corresponding to the preset operation time period. The preset lighting parameter threshold is the initial preset value by default, which is set for improving the work efficiency and ensuring non-visual health of indoor personnel. The preset lighting parameter thresholds include a preset beam angle, a preset color temperature value, and a preset illuminance value. The preset beam angle is kept at the maximum, and the preset color temperature value and preset illuminance value change with the time of day. In the automatic control mode, in the setting of the multi-parameter intelligent dynamic lighting adjustment system, there is a corresponding relationship between a lighting parameter and time. That is, different preset lighting parameter thresholds can be set at different time points. The preset color temperature value and preset illuminance value during the working period of the lighting device can be expressed in three modes: a wake-up mode, an alert mode, and a soothing mode, as shown in Table 1.

TABLE 1

Preset lighting parameter thresholds corresponding to three modes

| | Wake-up mode | Alert mode | Soothing mode |
|---|---|---|---|
| Time | 8:00-12:00 | 12:00-17:00 | 17:00-19:00 |
| Color temperature | 5000 K | 3500 K | 3000 K |
| illuminance | 250 lx | 270 lx | 1901 x |

In the manual adjustment mode, the control personnel can adjust the beam angle, illuminance, color temperature, and spectral characteristics of the lighting device using the personnel controller, and modify the preset threshold of lighting parameters, so as to create more lighting scenes according to actual use needs.

Figure 6:
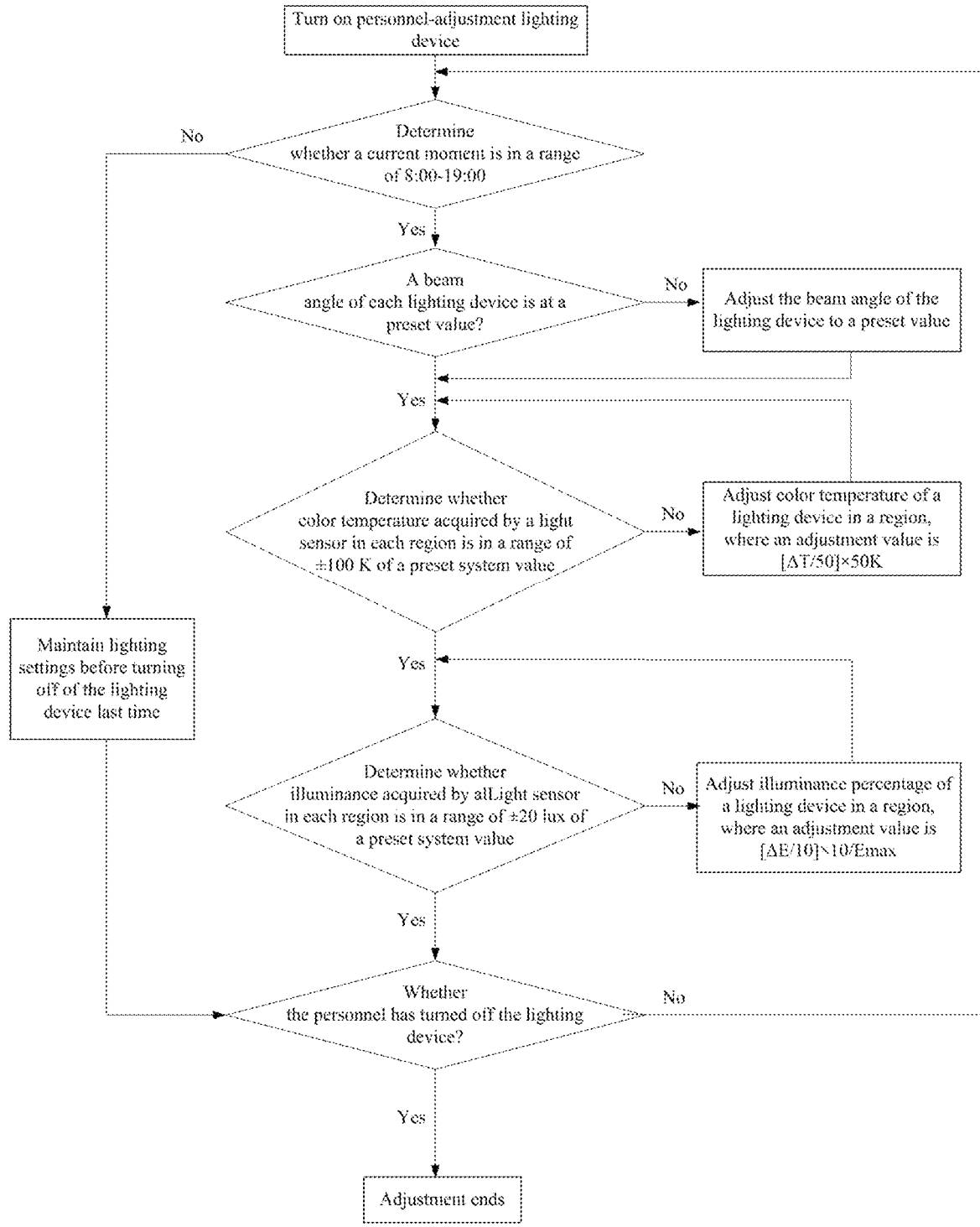
FIG. 6 is an operation flowchart of a multi-parameter intelligent dynamic lighting adjustment system in automatic control mode according to an embodiment of the present disclosure.
Figure 7:
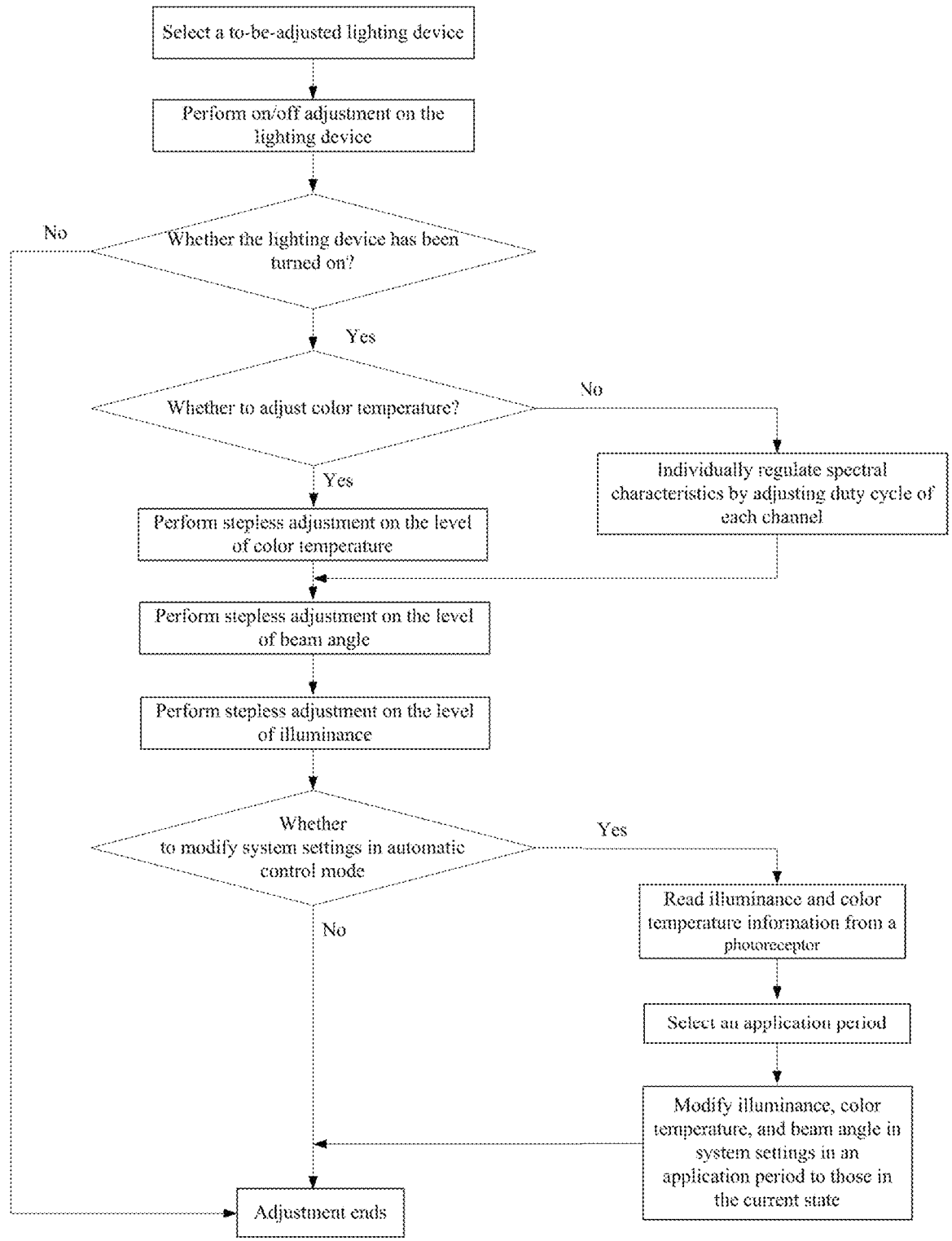
FIG. 7 is an operation flowchart of a multi-parameter intelligent dynamic lighting adjustment system in manual adjustment mode according to an embodiment of the present disclosure.

FIG. 6 is an operation flowchart of a multi-parameter intelligent dynamic lighting adjustment system in automatic control mode according to an embodiment of the present disclosure. Referring to FIG. 6, in the automatic control mode, after the personnel turns on the lighting device, the central processing unit determines whether the current moment is within the preset operation time period of 8:00-19:00. If the current moment is not within the preset operation time period, a lighting state of the lighting device is enabled to be an operation setting before turning off of the lighting device last time. In addition, it is determined whether the personnel has turned off the lighting device. If the lighting device has been turned off, the adjustment is completed. If the lighting device has not been turned off, return to the step of "determining whether the current moment is within the preset operation time period of 8:00-19:00." If the current moment is within the preset operation time period, it is first determined whether the beam angle of each lighting device is in the preset beam angle corresponding to the preset operation time period corresponding to the current moment. If it is not, the beam angle of each light device is adjusted, and the beam angle is adjusted to the preset beam angle corresponding to the preset operation time period. If it is, the illuminance and color temperature of the lighting device in each lighting control region are adjusted by region according to the monitoring information acquired by the light sensor in each lighting control region. It is determined whether the color temperature acquired by the light sensor in each lighting control region is within the range of ±100K of the preset color temperature value. If it is within this range, no color temperature is adjusted; otherwise, the color temperature of lighting device in the lighting control region is adjusted, where the color temperature in such region is not within the range of ±100 K of the preset color temperature value; and the adjustment value is [ΔT/50]×50K, where ΔT represents a color temperature difference, and $\Delta T=T_{preset}-T_{actual}$; $T_{preset}$ represents a system setting value of color temperature (that is, the preset color temperature value); and $T_{actual}$ represents an actual color temperature value acquired by the light sensor. Verification is made after the color temperature is adjusted. If the adjusted color temperature still cannot meet the requirement (that is, the adjusted color temperature is not within the range of ±100 K of the preset color temperature value), the color temperature adjustment process is repeated. After the color temperature adjustment is completed, the illuminance of each lighting control region is determined. Specifically, it is determined whether the illuminance acquired by the light sensors in each lighting control region is within the range of ±20 lux of the preset illuminance value. If the requirement is met (that is, the acquired illuminance is within the range of ±20 lux of the preset illuminance value), no illuminance is adjusted; otherwise, the illuminance percentage of the lighting device in the lighting control region is adjusted, where the illuminance in such region does not meet the requirement, and the adjustment value is [ΔE/10]×10/Emax, where ΔE represents an illuminance difference, and $\Delta E=E_{preset}-E_{actual}$; and $E_{preset}$ represents a system setting value of illuminance (that is, a preset illuminance value); $E_{actual}$ represents an actual illuminance value acquired by the light sensor; and Emax represents an illuminance value monitored by the light sensor under a maximum power of the lighting device and a natural light condition. After the illuminance is adjusted, it is determined whether the personnel has turned off the lighting device. If the lighting device has been turned off, the adjustment is completed. If the lighting device has not been turned off, return to the step of "determining whether the current moment is within the preset operation time period of 8:00-19:00." In the adjustment process, if the personnel has not turned off the lighting device, the adjustment process is maintained; otherwise, the adjustment process ends. FIG. 7 is an operation flowchart of a multi-parameter intelligent dynamic lighting adjustment system in manual adjustment mode according to an embodiment of the present disclosure. In the manual adjustment mode, the control personnel can adjust the beam angle, color temperature, illuminance, and spectral characteristics of the selected lighting device, and modify the lighting parameter preset threshold. The control personnel independently adjusts the duty cycle of each color channel of the light source to adjust the spectral characteristics, that is, the control personnel selects the composition ratio of each color channel of the light source, and then the control module calculates the duty cycle.

Referring to FIG. 7, the flow of the specific manual adjustment mode is as follows: the control personnel first selects the lighting device to be regulated, and adjusts its switch status (on/off). If the lighting device has been turned off, the regulating ends.

When the lighting device is turned on, the control personnel selects the adjustment mode of the spectral characteristics. The control personnel can adjust the spectral characteristics through the stepless adjustment on the color temperature, or can individually adjust the PWM duty cycle of each channel of the multi-channel light source to achieve individualized regulation on the spectral characteristics. If the lighting device is turned on, the control personnel first chooses whether to adjust the color temperature. If it is turned on, the spectral characteristics are adjusted through the stepless adjustment on the level of the color temperature; otherwise, the PWM duty cycle of each channel of the multi-channel light source is adjusted in a personalized manner, so as to individually regulates the spectral characteristics. The central processing unit converts the personalized adjustment requirements of the PWM duty cycle of each channel of the multi-channel light source into target parameters and can calculate the duty cycle parameter through the known base spectral parameters and the target parameters, so as to adjust the PWM duty cycle in a personalized manner. The target parameter is equal to the base spectrum parameter multiplied by the duty cycle parameter.

After the adjustment of the spectral characteristics is completed, the control personnel performs stepless adjustment on the beam angle and on the illuminance and chooses whether to modify the preset lighting parameter threshold in the automatic control mode according to the current state. If it needs to be modified, the central processing unit reads the current illuminance and color temperature information from the light sensor. After selecting the application period, in the personnel controller setting of the multi-parameter intelligent dynamic lighting adjustment system, the control personnel modifies the preset illuminance value, preset color temperature value, and preset beam angle in the selected application period, and modifies the preset illuminance value, preset color temperature value, and preset beam angle of the selected application period to those at the current state; otherwise, the regulating ends. The objective of choosing whether to modify the preset lighting parameter threshold according to the current state is to enable the control personnel to independently modify the operating state of the multi-parameter intelligent dynamic lighting adjustment system in the automatic control mode, that is, to adjust the initial preset value. Reading the current illuminance information and color temperature information is to obtain the current lighting environment status. If the current lighting environment state is the lighting scene that the control personnel wants the multi-parameter intelligent dynamic lighting adjustment system to realize in this application period, the application period corresponding to the current lighting environment state is selected, and the lighting parameters of the application period are modified. The application time period is selected because when modifying the preset lighting parameter threshold setting, the control personnel needs to select the time period to be used for the current lighting scene. For example, the control personnel modifies the preset illuminance value and preset color temperature value from 14:00-16:00 in the multi-parameter intelligent dynamic lighting adjustment system to the current illuminance value and color temperature value. In the manual adjustment mode, the lighting device usually maintains the operating state under the manual adjustment of the control personnel. Modifications to system settings (that is, lighting parameter preset thresholds) in the manual adjustment mode takes effect after the operation mode is switched to the automatic control mode.

The manual adjustment mode not only allows the control personnel to modify the indoor lighting control settings in the automatic control mode, but also creates a variety of personalized lighting scenes such as beam angle, spectral feature changes, and colored lighting, which enables the control personnel to have stronger self-regulation for the multi-parameter intelligent dynamic lighting adjustment system.

The present disclosure provides a multi-parameter intelligent dynamic lighting adjustment system, which can resolve the problem during the creation of an indoor dynamic non-visual lighting environment, improving the work efficiency and physiological and psychological state of indoor personnel. In addition, the present disclosure can further adjust multiple lighting parameters such as illuminance, color temperature, spectral characteristics, and beam angle, and can create various lighting scenes in a personalized manner. During the control and adjustment of lighting devices, the beam angle is adjusted by the intelligent lighting system using a mechanical push rod mechanism. A light sensor mounting method is proposed, which can monitor the light exposure of human eyes in different regions. In the manual adjustment mode, with the multi-channel personalized adjustment method of the light source, the control personnel can adjust the spectral characteristics of the light source, and create various scenes such as white light lighting color temperature change and colored lighting.

Each embodiment of the present specification is described in a progressive manner, each example focuses on the difference from other examples, and the same and similar parts between the examples may refer to each other. Since the system disclosed in an embodiment corresponds to the method disclosed in another embodiment, the description is relatively simple, and reference can be made to the method description.

Specific examples are used herein to explain the principles and embodiments of the present disclosure. The foregoing description of the embodiments is merely intended to help understand the method of the present disclosure and its core ideas; besides, various modifications may be made by a person of ordinary skill in the art to specific embodiments and the scope of application in accordance with the ideas of the present disclosure. In conclusion, the content of the present specification shall not be construed as limitations to the present disclosure.

What is claimed is:

1. A lighting adjustment system, comprising:
a light sensor, a personnel controller, a central processing unit, and a lighting device, wherein
the light sensor, the personnel controller, and the lighting device are all wirelessly connected to the central processing unit;
the light sensor is arranged at a monitoring point preset indoors, and configured to receive monitoring information at the monitoring point and transmit the monitoring information to the central processing unit, wherein the monitoring information comprises illuminance information and color temperature information, wherein a mounting height of the light sensor is an eye height of personnel in a sitting state, and wherein a monitoring probe of the light sensor is perpendicular to the ground, whereby the monitoring probe of the light sensor is configured to monitor a lighting condition of the lighting device in a perpendicular direction;
the personnel controller is configured to obtain a lighting environment creation selection of control personnel and transmit the lighting environment creation selection to the central processing unit;
the central processing unit is configured to receive the monitoring information of the light sensor and the lighting environment creation selection of the personnel controller, and regulate beam angle, color temperature, and illuminance of the lighting device in real time based on the monitoring information and the lighting environment creation selection; and
the lighting device is arranged at the monitoring point preset indoors and configured to perform lighting according to a regulatory instruction of the central processing unit.

2. The lighting adjustment system according to claim 1, wherein the lighting device specifically comprises a control module, a WiFi module, a light source module, and a driving module that are provided in a lamp tube, wherein
the control module communicates with the central processing unit using the WiFi module;
the light source module is mounted at a driving end of the driving module, and the control module is connected to both a control end of the light source module and a control end of the driving module;
the light source module is configured to perform lighting; and
the control module is configured to receive the regulatory instruction from the central processing unit, control, according to the regulatory instruction, the driving module to adjust a beam angle of the light source module, and adjust color temperature and illuminance of the light source module through a pulse width modulation dimming method.

3. The lighting adjustment system according to claim 2, wherein the driving module uses a mechanical push rod mechanism; and
the mechanical push rod mechanism comprises: a motor, an electric push rod, and a control device, wherein
a driving end of the motor is connected to one end of the electric push rod; and the motor is configured to drive the electric push rod to move back and forth;
the light source module is mounted at the other end of the electric push rod; and
the control device is connected to both the control module and the motor; and the control device is configured to control, according to an instruction for the control module to adjust the beam angle, the motor to drive the electric push rod to move back and forth.

4. The lighting adjustment system according to claim 1, wherein the central processing unit specifically comprises:
a current moment obtaining module configured to obtain a current moment;
a first determining module configured to determine whether the current moment is within a preset operation time period of the lighting device, to obtain a first determining result;
a lighting state adjusting module configured to adjust, when the first determining result is no, a lighting state of the lighting device to an operation setting before turning off of the lighting device last time;
an information obtaining module configured to obtain, when the first determining result is yes, the beam angle of the lighting device and monitoring information acquired by the light sensor at the current moment;
a lighting parameter adjusting module configured to adjust a lighting parameter of the lighting device according to the beam angle and monitoring information, such that the lighting parameter meets a preset lighting parameter threshold condition corresponding to the preset operation time period, wherein the lighting parameter comprises beam angle, color temperature, and illuminance.

5. The lighting adjustment system according to claim 4, wherein the lighting parameter adjusting module specifically comprises:
a second determining unit configured to determine whether the beam angle is equal to a preset beam angle corresponding to the preset operation time period, to obtain a second determining result;
a beam angle adjusting unit configured to adjust, when the second determining result is no, the beam angle of the lighting device to the preset beam angle corresponding to the preset operation time period;
a third determining unit configured to determine, when the second determining result is yes, according to the monitoring information, whether the color temperature of the lighting device is in a preset color temperature threshold range corresponding to the preset operation time period, to obtain a third determining result;
a color temperature adjusting unit configured to adjust, when the third determining result is no, the color temperature of the lighting device using a pulse width modulation dimming method, such that the color temperature is in the preset color temperature threshold range;
a fourth determining unit configured to determine, when the third determining result is yes, according to the monitoring information, whether the illuminance of the lighting device is in a preset illuminance threshold range corresponding to the preset operation time period, to obtain a fourth determining result; and
an illuminance adjusting unit configured to adjust, when the fourth determining result is no, the illuminance of the lighting device using the pulse width modulation dimming method, such that the illuminance is in the preset illuminance threshold range.

6. A lighting adjustment method applied to the lighting adjustment system according to of claim 1, wherein the lighting adjustment method comprises:
obtaining a current moment;
determining whether the current moment is within a preset operation time period of a lighting device so as to obtain a first determining result;
when the first determining result is no, adjusting a lighting state of the lighting device to an operation setting before turning off of the lighting device last time;
when the first determining result is yes, obtaining beam angle of the lighting device and monitoring information acquired by a light sensor at the current moment; and
adjusting a lighting parameter of the lighting device according to the beam angle and monitoring information, such that the lighting parameter meets a preset lighting parameter threshold condition corresponding to the preset operation time period, wherein the lighting parameter comprises beam angle, color temperature, and illuminance.

7. The lighting adjustment method according to claim 6, wherein the lighting device specifically comprises a control module, a WiFi module, a light source module, and a driving module that are provided in a lamp tube, wherein
the control module communicates with the central processing unit using the WiFi module;
the light source module is mounted at a driving end of the driving module, and the control module is connected to both a control end of the light source module and a control end of the driving module;
the light source module is configured to perform lighting; and
the control module is configured to receive the regulatory instruction from the central processing unit, control, according to the regulatory instruction, the driving module to adjust a beam angle of the light source module, and adjust color temperature and illuminance of the light source module through a pulse width modulation dimming method.

8. The lighting adjustment method according to claim 7, wherein the driving module uses a mechanical push rod mechanism; and
the mechanical push rod mechanism comprises: a motor, an electric push rod, and a control device, wherein
a driving end of the motor is connected to one end of the electric push rod; and the motor is configured to drive the electric push rod to move back and forth;
the light source module is mounted at the other end of the electric push rod; and
the control device is connected to both the control module and the motor; and the control device is configured to control, according to an instruction for the control module to adjust the beam angle, the motor to drive the electric push rod to move back and forth.

9. The lighting adjustment method according to claim 6, wherein the central processing unit specifically comprises:
a current moment obtaining module configured to obtain a current moment;

a first determining module configured to determine whether the current moment is within a preset operation time period of the lighting device, to obtain a first determining result;
a lighting state adjusting module configured to adjust, when the first determining result is no, a lighting state of the lighting device to an operation setting before turning off of the lighting device last time;
an information obtaining module configured to obtain, when the first determining result is yes, the beam angle of the lighting device and monitoring information acquired by the light sensor at the current moment;
a lighting parameter adjusting module configured to adjust a lighting parameter of the lighting device according to the beam angle and monitoring information, such that the lighting parameter meets a preset lighting parameter threshold condition corresponding to the preset operation time period, wherein the lighting parameter comprises beam angle, color temperature, and illuminance.

10. The lighting adjustment method according to claim 9, wherein the lighting parameter adjusting module specifically comprises:
a second determining unit configured to determine whether the beam angle is equal to a preset beam angle corresponding to the preset operation time period, to obtain a second determining result;
a beam angle adjusting unit configured to adjust, when the second determining result is no, the beam angle of the lighting device to the preset beam angle corresponding to the preset operation time period;
a third determining unit configured to determine, when the second determining result is yes, according to the monitoring information, whether the color temperature of the lighting device is in a preset color temperature threshold range corresponding to the preset operation time period, to obtain a third determining result;
a color temperature adjusting unit configured to adjust, when the third determining result is no, the color temperature of the lighting device using a pulse width modulation dimming method, such that the color temperature is in the preset color temperature threshold range;
a fourth determining unit configured to determine, when the third determining result is yes, according to the monitoring information, whether the illuminance of the lighting device is in a preset illuminance threshold range corresponding to the preset operation time period, to obtain a fourth determining result; and
an illuminance adjusting unit configured to adjust, when the fourth determining result is no, the illuminance of the lighting device using the pulse width modulation dimming method, such that the illuminance is in the preset illuminance threshold range.

11. The lighting adjustment method according to claim 6, wherein the adjusting a lighting parameter of the lighting device according to the beam angle and monitoring information, such that the lighting parameter meets a preset lighting parameter threshold condition corresponding to the preset operation time period specifically comprises:
determining whether the beam angle is equal to a preset beam angle corresponding to the preset operation time period so as to obtain a second determining result;
when the second determining result is no, adjusting the beam angle of the lighting device to the preset beam angle corresponding to the preset operation time period;
when the second determining result is yes, determining, according to the monitoring information, whether the color temperature of the lighting device is in a preset color temperature threshold range corresponding to the preset operation time period so as to obtain a third determining result;
when the third determining result is no, adjusting the color temperature of the lighting device using a pulse width modulation dimming method, such that the color temperature is in the preset color temperature threshold range;
when the third determining result is yes, determining, according to the monitoring information, whether the illuminance of the lighting device is in a preset illuminance threshold range corresponding to the preset operation time period, so as to obtain a fourth determining result; and
when the fourth determining result is no, adjusting the illuminance of the lighting device using the pulse width modulation dimming method, such that the illuminance is in the preset illuminance threshold range.

12. The lighting adjustment method according to claim 7, wherein the adjusting a lighting parameter of the lighting device according to the beam angle and monitoring information, such that the lighting parameter meets a preset lighting parameter threshold condition corresponding to the preset operation time period specifically comprises:
determining whether the beam angle is equal to a preset beam angle corresponding to the preset operation time period so as to obtain a second determining result;
when the second determining result is no, adjusting the beam angle of the lighting device to the preset beam angle corresponding to the preset operation time period;
when the second determining result is yes, determining, according to the monitoring information, whether the color temperature of the lighting device is in a preset color temperature threshold range corresponding to the preset operation time period so as to obtain a third determining result;
when the third determining result is no, adjusting the color temperature of the lighting device using a pulse width modulation dimming method, such that the color temperature is in the preset color temperature threshold range;
when the third determining result is yes, determining, according to the monitoring information, whether the illuminance of the lighting device is in a preset illuminance threshold range corresponding to the preset operation time period, so as to obtain a fourth determining result; and
when the fourth determining result is no, adjusting the illuminance of the lighting device using the pulse width modulation dimming method, such that the illuminance is in the preset illuminance threshold range.

13. The lighting adjustment method according to claim 8, wherein the adjusting a lighting parameter of the lighting device according to the beam angle and monitoring information, such that the lighting parameter meets a preset lighting parameter threshold condition corresponding to the preset operation time period specifically comprises:
determining whether the beam angle is equal to a preset beam angle corresponding to the preset operation time period so as to obtain a second determining result;

when the second determining result is no, adjusting the beam angle of the lighting device to the preset beam angle corresponding to the preset operation time period;

when the second determining result is yes, determining, according to the monitoring information, whether the color temperature of the lighting device is in a preset color temperature threshold range corresponding to the preset operation time period so as to obtain a third determining result;

when the third determining result is no, adjusting the color temperature of the lighting device using a pulse width modulation dimming method, such that the color temperature is in the preset color temperature threshold range;

when the third determining result is yes, determining, according to the monitoring information, whether the illuminance of the lighting device is in a preset illuminance threshold range corresponding to the preset operation time period, so as to obtain a fourth determining result; and when the fourth determining result is no, adjusting the illuminance of the lighting device using the pulse width modulation dimming method, such that the illuminance is in the preset illuminance threshold range.

14. The lighting adjustment method according to claim 9, wherein the adjusting a lighting parameter of the lighting device according to the beam angle and monitoring information, such that the lighting parameter meets a preset lighting parameter threshold condition corresponding to the preset operation time period specifically comprises:

determining whether the beam angle is equal to a preset beam angle corresponding to the preset operation time period so as to obtain a second determining result;

when the second determining result is no, adjusting the beam angle of the lighting device to the preset beam angle corresponding to the preset operation time period;

when the second determining result is yes, determining, according to the monitoring information, whether the color temperature of the lighting device is in a preset color temperature threshold range corresponding to the preset operation time period so as to obtain a third determining result;

when the third determining result is no, adjusting the color temperature of the lighting device using a pulse width modulation dimming method, such that the color temperature is in the preset color temperature threshold range;

when the third determining result is yes, determining, according to the monitoring information, whether the illuminance of the lighting device is in a preset illuminance threshold range corresponding to the preset operation time period, so as to obtain a fourth determining result; and when the fourth determining result is no, adjusting the illuminance of the lighting device using the pulse width modulation dimming method, such that the illuminance is in the preset illuminance threshold range.

15. The lighting adjustment method according to claim 10, wherein the adjusting a lighting parameter of the lighting device according to the beam angle and monitoring information, such that the lighting parameter meets a preset lighting parameter threshold condition corresponding to the preset operation time period specifically comprises:

determining whether the beam angle is equal to a preset beam angle corresponding to the preset operation time period so as to obtain a second determining result;

when the second determining result is no, adjusting the beam angle of the lighting device to the preset beam angle corresponding to the preset operation time period;

when the second determining result is yes, determining, according to the monitoring information, whether the color temperature of the lighting device is in a preset color temperature threshold range corresponding to the preset operation time period so as to obtain a third determining result;

when the third determining result is no, adjusting the color temperature of the lighting device using a pulse width modulation dimming method, such that the color temperature is in the preset color temperature threshold range;

when the third determining result is yes, determining, according to the monitoring information, whether the illuminance of the lighting device is in a preset illuminance threshold range corresponding to the preset operation time period, so as to obtain a fourth determining result; and when the fourth determining result is no, adjusting the illuminance of the lighting device using the pulse width modulation dimming method, such that the illuminance is in the preset illuminance threshold range.

16. The lighting adjustment method according to claim 11, wherein the adjusting the color temperature of the lighting device using a pulse width modulation dimming method, such that the color temperature is in the preset color temperature threshold range specifically comprises:

adjusting the color temperature of the lighting device using the pulse width modulation dimming method, and adjusting an adjustment value of the color temperature to $[\Delta T/50] \times 50K$, wherein $\Delta T$ represents a color temperature difference, and $\Delta T = T_{preset} - T_{actual}$; and $T_{preset}$ represents a preset color temperature value corresponding to the preset operation time period; $T_{actual}$ represents an actual color temperature value acquired by the light sensor; and K represents a unit of the color temperature;

determining whether the adjusted color temperature is in the preset color temperature threshold range so as to obtain a fifth determining result, wherein the preset color temperature threshold range is from a preset color temperature value −100 K to a preset color temperature value +100 K, and such range corresponds to the preset operation time period; and if the fifth determining result is no, returning to the adjusting the color temperature of the lighting device using the pulse width modulation dimming method, and adjusting an adjustment value of the color temperature to $[\Delta T/50] \times 50K$.

17. The lighting adjustment method according to claim 11, wherein the adjusting the illuminance of the lighting device using the pulse width modulation dimming method, such that the illuminance is in the preset illuminance threshold range specifically comprises:

adjusting the illuminance of the lighting device using the pulse width modulation dimming method, and adjusting an adjustment value of the illuminance to $[\Delta E/10] \times 10/E_{max}$, wherein $\Delta E$ represents an illuminance difference, and $\Delta E = E_{preset} - E_{actual}$; and $E_{preset}$ represents a preset illuminance value corresponding to the preset operation time period; $E_{actual}$ represents an actual illuminance value acquired by the light sensor; and Emax represents an illuminance value monitored by the light sensor under a maximum power of the lighting device and a natural light condition; and determining whether the adjusted illuminance is in the preset illuminance threshold range so as to obtain a sixth determining result, wherein the preset illuminance threshold range is from a preset illuminance value −20 lux to a preset illuminance value +20 lux, such range corresponds to the preset operation time period, and lux represents a unit of illuminance; and if the sixth determining result is no, returning to the adjusting the illuminance of the lighting device using the pulse width modulation dimming method, and adjusting an adjustment value of the illuminance to $[\Delta E/10] \times 10/Emax$.

* * * * *